United States Patent
Bates et al.

(10) Patent No.: US 6,337,702 B1
(45) Date of Patent: Jan. 8, 2002

(54) METHOD AND SYSTEM FOR GRAPHICALLY INDICATING A VALID INPUT WITHIN A GRAPHICAL USER INTERFACE

(75) Inventors: Cary L. Bates, Rochester; Jeffrey M. Ryan, Byron, both of MN (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 08/735,776

(22) Filed: Oct. 23, 1996

(51) Int. Cl.⁷ .................................................. G09G 5/00
(52) U.S. Cl. ...................... 345/857; 345/858; 345/859; 345/860; 345/861
(58) Field of Search .................................. 345/173, 856, 345/857, 858, 859, 860, 861, 862

(56) References Cited

U.S. PATENT DOCUMENTS

| | | | |
|---|---|---|---|
| 5,230,063 A | | 7/1993 | Hoeber et al. ............... 345/354 |
| 5,276,795 A | | 1/1994 | Hoeber et al. ............... 345/353 |
| 5,469,192 A | * | 11/1995 | Allen et al. ................... 345/157 |
| 5,491,495 A | * | 2/1996 | Ward et al. ................... 345/173 |
| 5,613,090 A | * | 3/1997 | Willems ....................... 395/500 |
| 5,655,093 A | * | 8/1997 | Frid-Nielsen ................ 345/326 |
| 5,757,925 A | * | 5/1998 | Faybishenko ................ 380/49 |

* cited by examiner

*Primary Examiner*—Ba Huynh
(74) *Attorney, Agent, or Firm*—Bracewell & Patterson, LLP

(57) ABSTRACT

A data processing system and method of graphically indicating a valid input are provided. In accordance with the present invention, a graphical display including one or more regions is displayed within a display device of a data processing system. In addition, a graphical object corresponding to the user input device is displayed within the display device. A particular one of the one or more regions is then identified. An aspect of the graphical object indicates whether or not manipulation of the user input device will generate an input while the particular region is identified.

1 Claim, 6 Drawing Sheets

METHOD AND SYSTEM FOR GRAPHICALLY INDICATING A VALID INPUT WITHIN A GRAPHICAL USER INTERFACE

BACKGROUND OF THE INVENTION

1. Technical Field

The present invention relates in general to a method and system for data processing and in particular to a data processing system and method for graphically indicating a valid input within a graphical user interface. Still more particularly, the present invention relates to a data processing system and method for graphically indicating whether or not manipulation of a user input device will generate a valid input while a particular region of a graphical display is identified.

2. Description of the Related Art

The development and proliferation of graphical user interfaces (GUIs) has greatly enhanced the ease with which users interact with data processing systems. A conventional GUI display includes a desktop metaphor upon which one or more icons, application windows, or other graphical objects are displayed. Typically, a data processing system user interacts with a GUI display utilizing a graphical pointer, which the user controls with a graphical pointing device such as a mouse, trackball, or joystick. For example, depending upon the actions allowed by the active application or operating system software, the user can select icons or other graphical objects within the GUI display by positioning the graphical pointer over the graphical object and depressing a button associated with the graphical pointing device. In addition, the user can typically relocate icons, application windows, and other graphical objects on the desktop utilizing the well known drag-and-drop technique. By manipulating the graphical objects within the GUI display, the user can control the underlying hardware devices and software objects represented by the graphical objects in a graphical and intuitive manner.

Conventional GUIs frequently include at least one icon or application window that supports multiple functions. Such GUIs often assign one of the multiple functions to each button of the graphical pointing device in order to permit the user to easily invoke a selected one of the functions supported by the multifunction icon or window. When the GUI includes a large number of multifunction icons or windows as well as other single-function graphical objects, it is often difficult for a user to remember which button selections will generate a valid input for each window and icon, particularly when the permissible button selections change during data processing. Because conventional GUIs do not provide a user with an indication of the inputs supported by each of the various graphical objects, the user must often resort to trial-and-error to determine which inputs a selected graphical object supports. Thus, the failure of conventional GUIs to provide a graphical indication of the inputs each graphical object supports diminishes the graphical and intuitive appeal of conventional GUIs.

As should thus be apparent, it would be desirable to provide an improved method and system for indicating to a user which inputs are supported within a GUI.

SUMMARY OF THE INVENTION

It is therefore one object of the present invention to provide an improved method and system for data processing.

It is another object of the present invention to provide an improved data processing system and method for graphically indicating a valid input within a graphical user interface.

It is yet another object of the present invention to provide a data processing system and method for graphically indicating whether or not manipulation of a user input device will generate a valid input while a particular region of a graphical display is identified.

The foregoing objects are achieved as is now described. A data processing system and method of graphically indicating a valid input are provided. In accordance with the present invention, a graphical display including one or more regions is displayed within a display device of a data processing system. In addition, a graphical object corresponding to the user input device is displayed within the display device. A particular one of the one or more regions is then identified. An aspect of the graphical object indicates whether or not manipulation of the user input device will generate an input while the particular region is identified.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
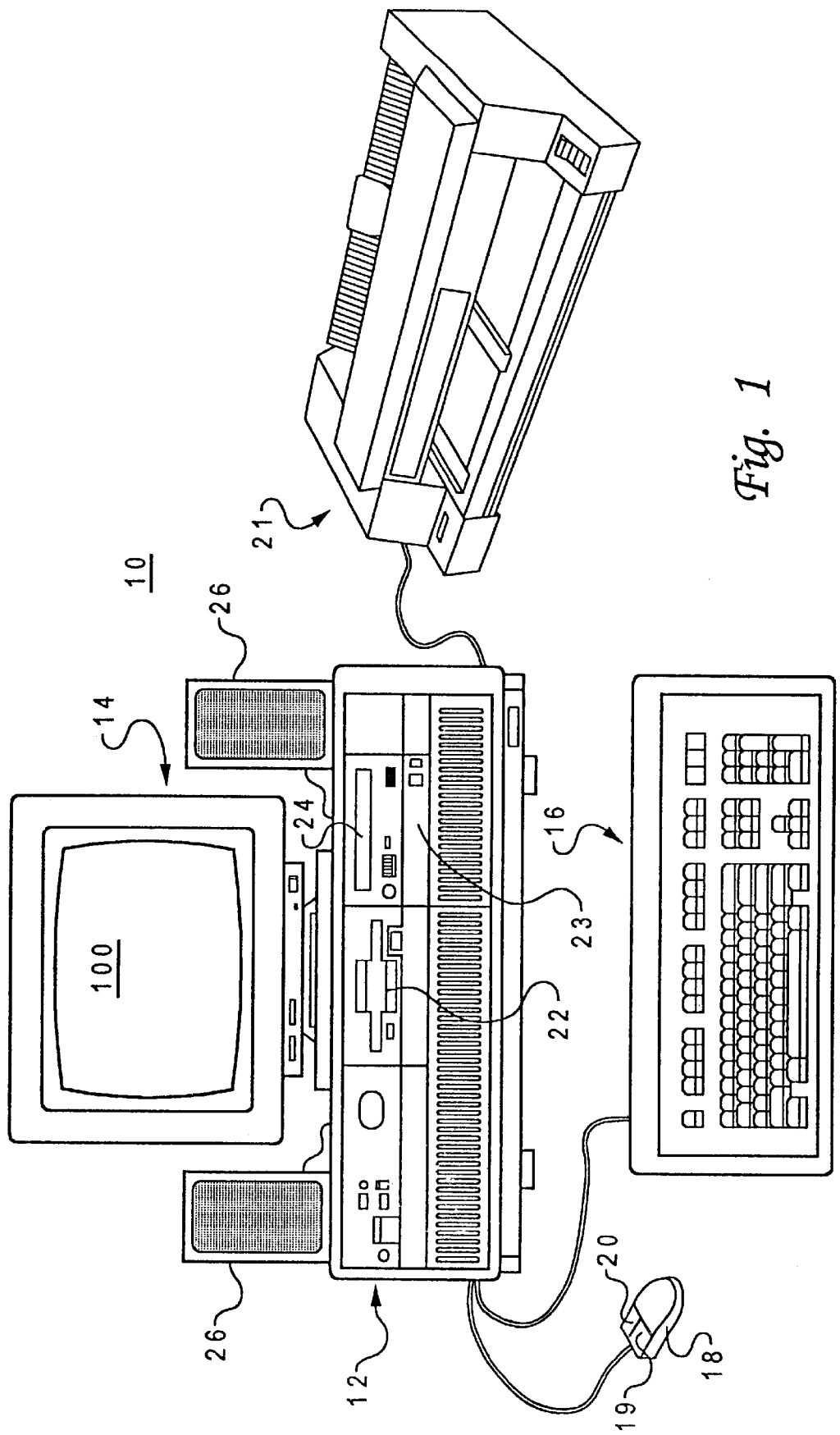
FIG. 1 depicts an illustrative embodiment of a data processing system that can be utilized to implement the present invention.

With reference now to the figures and in particular with reference to FIG. 1, there is depicted an illustrative embodiment of a data processing system that may be utilized to implement the present invention. As illustrated, data processing system 10 includes processing unit 12, display device 14, keyboard 16, mouse 18, printer 21, and speakers 26. As is well-known in the computer arts, processing unit 12 receives input data from input devices such as keyboard 16, mouse 18, and local area networking interfaces (not illustrated) and presents output data to a user via display device 14, printer 21, and speakers 26. As described in detail below, mouse 18, which includes left button 19 and right button 20, is preferably utilized in conjunction with a graphical user interface (GUI) in which hardware components and software objects are controlled through the selection and manipulation of associated graphical objects displayed within display device 14. Although data processing system 10 is illustrated with mouse 18, those skilled in the art will recognize that other graphical pointing devices such as a graphics tablet, joystick, trackball, trackpad, or IBM TrackPoint™ can also be utilized. To support storage and retrieval of data, processing unit 12 further includes diskette drive 22, hard disk drive 23, and CD-ROM drive 24, which are interconnected with other components of processing unit 12 in a well-known manner. Of course, those skilled in the art are aware that additional conventional components can also be connected to processing unit 12.

Figure 2:
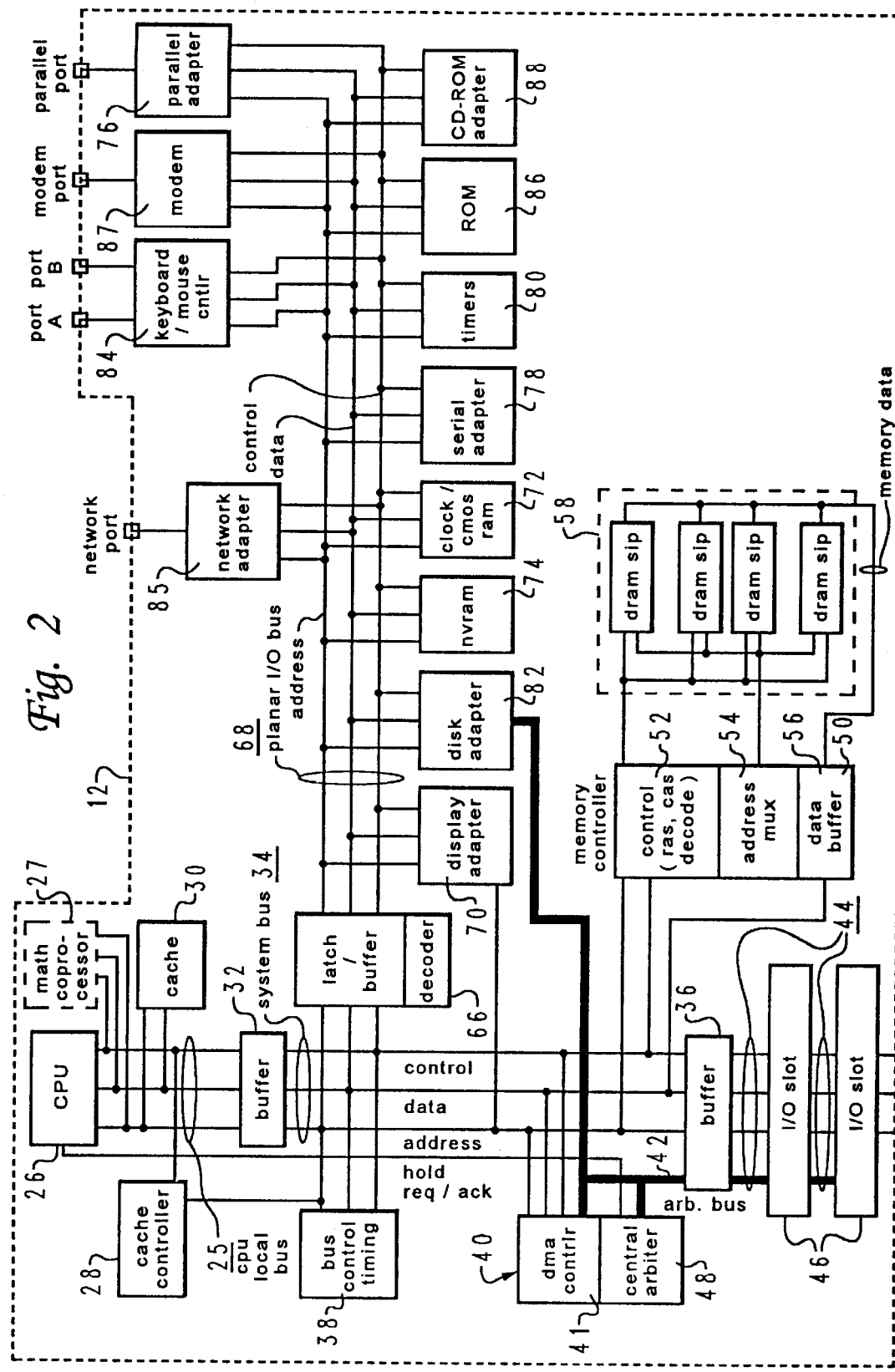
FIG. 2 illustrates a more detailed block diagram representation of the processing unit of the data processing system illustrated in FIG. 1.

Referring now to FIG. 2, there is depicted a block diagram of the principal components of processing unit 12 of data processing system 10. As illustrated, processing unit 12 includes a central processing unit (CPU) 26 which executes software instructions. While any appropriate processor can be utilized for CPU 26, CPU 26 is preferably one of the PowerPC™ line of microprocessors available from IBM Microelectronics. Alternatively, CPU 26 can be implemented as one of the 80×86 or Pentium processors, which are available from a number of vendors.

In addition to CPU 26, an optional math coprocessor 27, cache controller 28, and cache memory 30 are coupled to high-speed CPU local bus 25. Math coprocessor 27 is an optional processor, distinct from CPU 26, that performs numeric calculations with greater efficiency than CPU 26. Math coprocessor 27 is optional since the performance advantage provided by a math coprocessor may be achieved by enhancements to CPU 26, such as the implementation of multiple fixed-point or floating-point execution units. Cache memory 30 comprises a small high-speed memory which stores frequently accessed data and instructions. Cache 30 operates under the control of cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 retrieves data and instructions from and stores data to volatile random access memory (RAM) 58 through memory controller 50, which comprises memory control unit 52, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules that store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within nonvolatile storage devices 22–24.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and expansion bus 44. Connected to expansion bus 44 are a number of I/O slots 46 for receiving adapter cards which may be further connected to additional memory or I/O devices, such as speakers 26. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 among the bus masters coupled to expansion bus 44. Bus master support allows multiprocessor configurations of expansion bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 23 and diskette drive 22. Disk adapter 82 handles tasks such as positioning the read/write heads within drives 22 and 23 and mediating between drives 22 and 23 and CPU 26. Nonvolatile RAM 74 stores system configuration data that describes the present configuration of data processing system 10. For example, nonvolatile RAM 74 contains information that describes the capacity of hard disk drive 23 or a diskette placed within diskette drive 22, the type of display device 14, the amount of free RAM 58, and the present system configuration. These data remain stored in nonvolatile RAM 74 when power is removed from data processing system 10.

Clock 72 is utilized by application programs executed by CPU 26 for time of day calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system 10.

ROM 86 typically stores a basic input/output system (BIOS), which provides user-transparent I/O when CPU 26 is operating under a selected operating system. BIOS also includes power on self-test (POST) diagnostic routines which perform system set up at power on. For example, POST interrogates hardware, allocates a BIOS data area (BDA), constructs an interrupt vector table to point to interrupt handling routines within ROM 86, and initializes timers 80, clock 72 and other devices within processing unit 12. CD-ROM adapter 88 interfaces CD-ROM drive 24 with planar I/O bus 34 to support retrieval of data from an optical disk loaded within CD-ROM drive 24. Keyboard/mouse controller 84 interfaces processing unit 12 with keyboard 16 and a graphical pointing device, such as mouse 18.

Finally, processing unit 12 includes network adapter 85, modem 87, and parallel adapter 76, which facilitate communication between data processing system 10 and peripheral devices or other data processing systems. Network adapter 85 is utilized to connect data processing system 10 to an unillustrated local area network (LAN). A LAN provides a user of data processing system 10 with a means of electronically communicating information, including software, with a remote computer or a network logical storage device. Additionally, LAN supports distributed processing, which enables data processing system 10 to share a task with other data processing systems linked to the LAN. Modem 87 supports communication between data processing system 10 and another data processing system over a standard telephone line. Through modem 87, data processing system 10 can access sources of software, such as an on-line service provider, a server, an electronic bulletin board, and the Internet or World Wide Web. Parallel port 76 transmits printer control signals and output data to printer 21 through a parallel port.

As will be described in detail below, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer via a variety of signal-bearing media, which include, but are not limited to: (a) information permanently stored on non-writable storage media (e.g., read only memory devices within a computer such as ROM 86 or CD-ROM disks readable by CD-ROM drive 24); (b) information alterably stored on writable storage media (e.g., floppy disks within diskette drive 22 or hard disk drive 23); or (c) information conveyed to a computer through communication media, such as through a computer or telephone network. It should be understood, therefore, that such signal-bearing media, when carrying computer readable instructions that direct the method functions of the present invention, represent alternative embodiments of the present invention.

Figure 3:
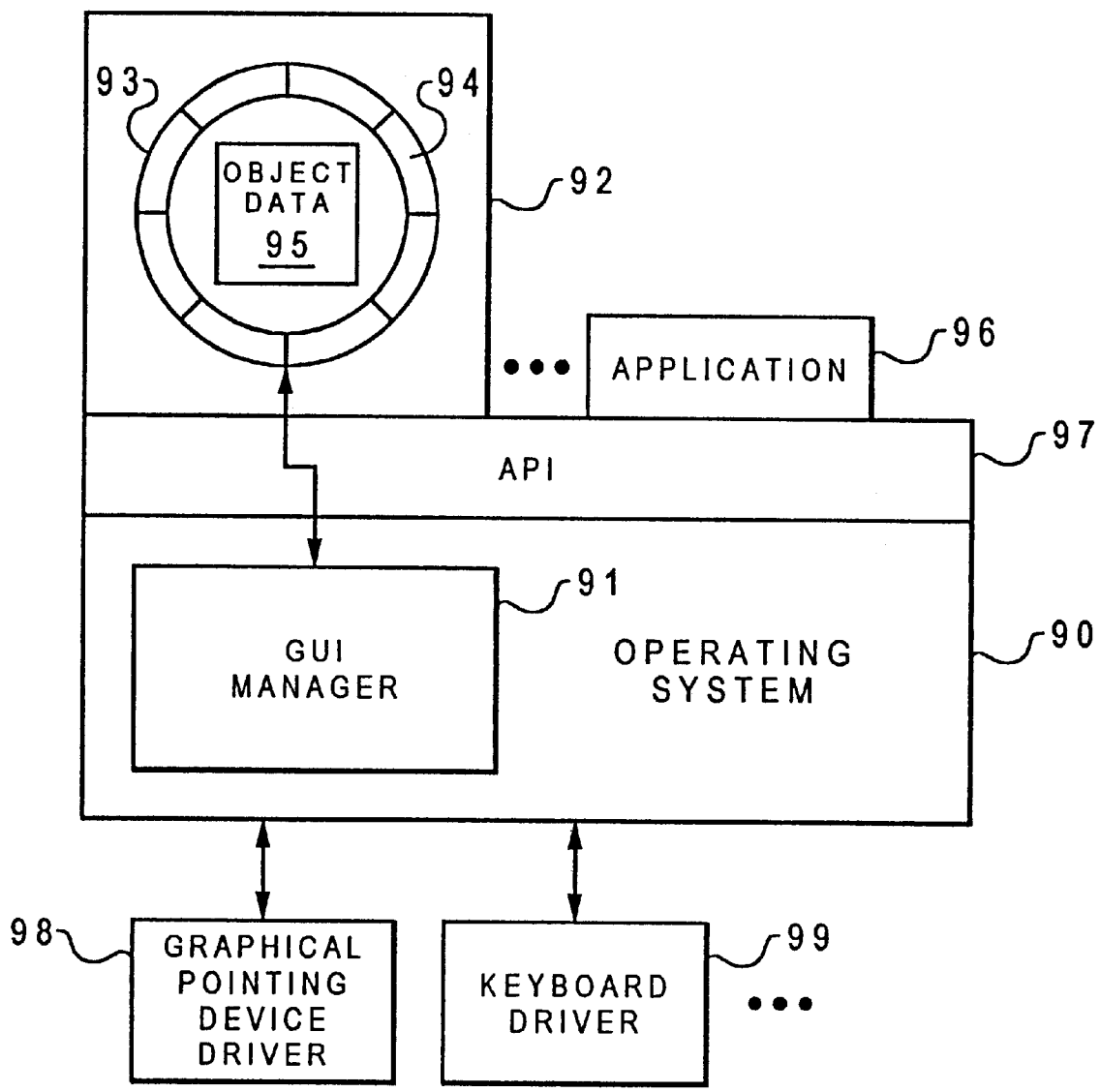
FIG. 3 depicts a block diagram representation of a preferred embodiment of the software configuration of the data processing system depicted in FIG. 1.

With reference now to FIG. 3, there is illustrated a pictorial representation of the software configuration of data processing system 10 in accordance with the present invention. As noted above, the software executed by data processing system 10 can be stored within one or more of volatile RAM 58, the nonvolatile storage provided by diskette drive 22, hard disk drive 23, and CD-ROM drive 24, or a remote server accessible via modem 87 or network adapter 85. As illustrated, the software configuration of data processing system 10 includes an operating system (OS) 90, which provides a background computing environment that is implemented as a set of system services accessible to user applications 92 and 96 via Application Programming Interface (API) 97. OS 90 is also responsible for managing the allocation and usage of the resources of data processing system 10, for example, by assigning CPU time to various execution threads and allocating portions of RAM 58 for use by various user applications 92 and 96. As indicated within user application 92, each user application running on OS 90 can be viewed as a collection of one or more program objects 93, which each have associated methods 94 and object data 95.

The software configuration of data processing system 10 further comprises a number of device driver programs, which permit OS 90 to communicate with the adapter hardware utilized to interface various peripheral components to system unit 12 of data processing system 10. For example, graphical pointing device driver 98 and keyboard driver 99 translate the user inputs received from keyboard/mouse controller 84 into events recognized by OS 90. In accordance with the present invention, events passed to OS 90 by device drivers 98 and 99 are received by a GUI manager 91, which routes the events to one or more registered program objects 93 within data processing system 10. For example, in response to movement of mouse 18 or depression of one or both of buttons 19 and 20 while a graphical pointer controlled by mouse 18 is positioned within a window associated with program object 93 of user application 92, mouse 18 generates analog electrical signals that are transmitted to keyboard/mouse controller 84. In response to receipt of the analog electrical signals, keyboard/mouse controller 84 converts the analog electrical signals into a digital value indicating, for example, that left button 19 has been depressed. The digital value is then read by graphical pointing device driver 98, translated into an event format utilized by OS 90, and sent to GUI manager 91. Finally, GUI manager 91 sends a message containing a pair of cartesian coordinates and the status of buttons 19 and 20 to graphical object 93, which processes the message (event) in accordance with one or more methods 94.

Figure 4:
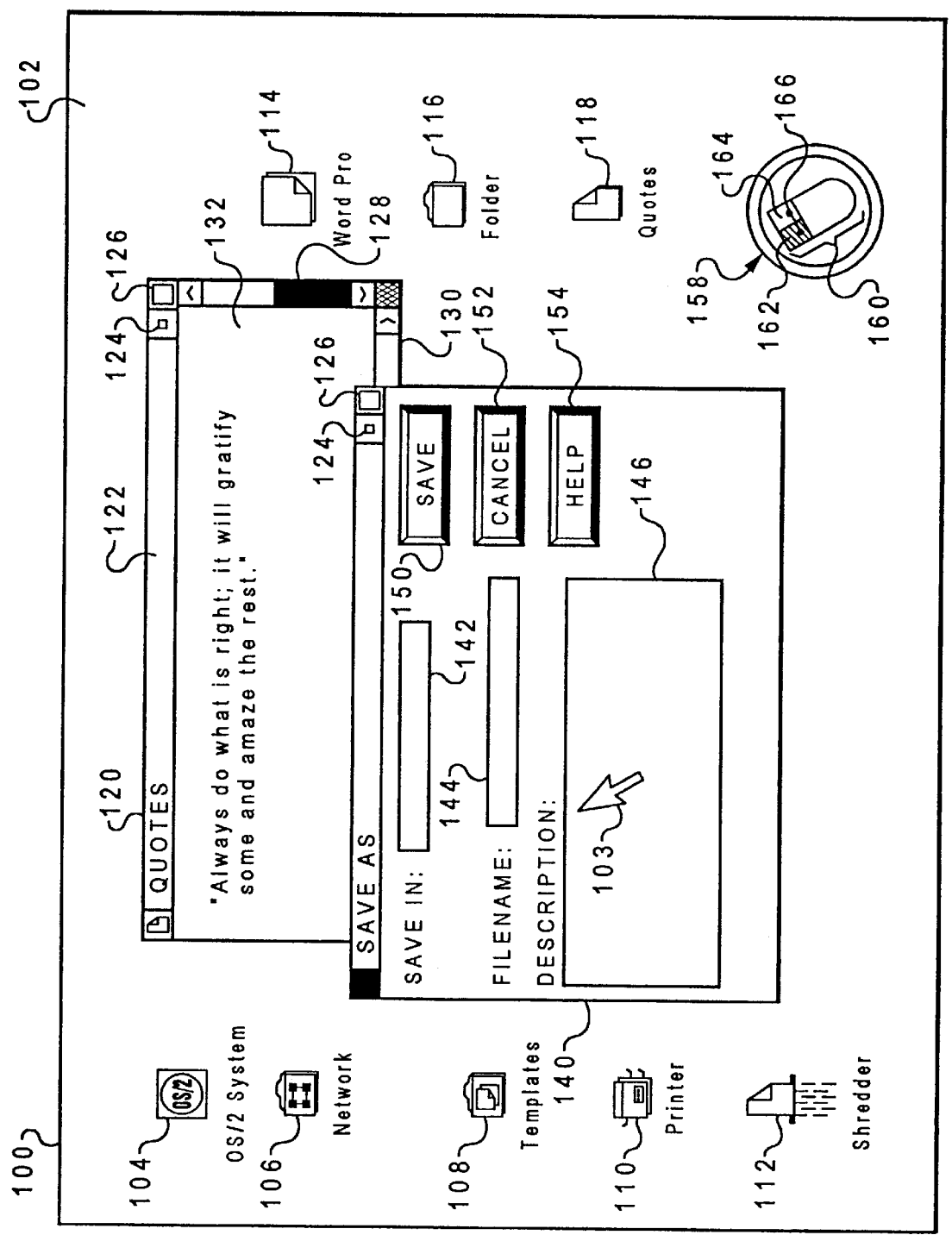
FIG. 4 illustrates a graphical user interface (GUI) display in accordance with a first preferred embodiment of the present invention.

Referring now to FIG. 4, there is depicted a graphical user interface (GUI) display, which graphically indicates to a user of data processing system 10 which inputs are valid for an identified region of the GUI display in accordance with a first preferred embodiment of the present invention. As illustrated, a plurality of user-selectable icons 104–118 are displayed on a background desktop 102 within display screen 100 of display device 14. Each of icons 104–118 represents a program object, document, function(s), or file storage area, which a user can conveniently select by positioning graphical pointer 103 on the icon and double-clicking left button 19 of mouse 18. When a user selects one of icons 104–118, the selected icon is highlighted and the function corresponding to the selected icon is activated. Many of icons 104–118 have an associated window or series of windows that are displayed when the icon is selected. For example, when Quotes icon 118 is selected, an application window 120 generated by the word processing application represented by icon 114 is displayed. Like conventional application windows, application window 120 comprises title bar 122, minimize button 124, maximize button 126, vertical scroll bar 128, horizontal scroll bar 130, and a text field 132 in which the contents of the Quotes document are displayed.

In the depicted data processing scenario, the user has also caused a dialog box 140 to be displayed by selecting the "Save As" function of the word processing application represented by icon 114. Dialog box 140 includes a number of input fields 142–146 into which a user can enter data pertaining to a file to be stored (e.g., the document represented by Quotes icon 118). In addition, dialog box 140 includes buttons 150–154, which the user can select utilizing graphical pointer 103 to invoke an indicated function. Thus, in order to save a file utilizing the information entered in input fields 142–146, the user selects button 150. Alternatively, to cancel the save operation and close dialog box 140 or to invoke a help utility, the user selects button 152 or 154, respectively. In accordance with a preferred embodiment of the present invention, input fields 142–146 and buttons 150–154 (hereafter collectively termed "input regions") are each uniquely associated with a respective input manager method of the program object 93 that controls the window (or other area of the graphical display) in which the input region is displayed. The input manager method processes events received from GUI manager 91 according to the process described below with reference to FIG. 6. In addition to the conventional information utilized to manage a window, the object data 95 of each program object 93 includes the following data for each input region controlled by the program object 93: (1) a current mouse button state that indicates the mouse button selections that currently generate valid inputs within the input region, (2) the help text applicable to the current mouse button state, (3) an indication of the immediately previous mouse button state, and (4) the help text applicable to the immediately previous mouse button state.

In accordance with the first preferred embodiment of the present invention, an input device icon 158 is displayed on desktop 102 by GUI manager 91. As illustrated, input device icon 158 includes a graphical representation 160 of mouse 18. Graphical representation 160 comprises a left portion 162 and a right portion 164, which correspond to left and right buttons 19 and 20, respectively. As described further hereinbelow, when a user of data processing system 10 identifies an input region of display screen 100, for example, by positioning graphical pointer 103 within the input region, the input manager associated with the identified input region graphically indicates which user inputs are valid within the identified input region by highlighting the appropriate one(s) of left portion 162 and right portion 164. For example, as illustrated in FIG. 4, by positioning graphical pointer 103 as shown, the user has identified input field 146 of dialog box 140. Based upon the current state of the word processing application represented by icon 114 and the inputs currently entered within dialog box 96, the input manager method associated with input field 146 indicates that depressing left button 19 will generate a valid input by causing left region 162 of input device icon 158 to be displayed in a highlighted state. Similarly, by causing a bar 166 to be displayed connecting portions 162 and 164, the input manager method indicates that depressing left button 19 and right button 20 substantially simultaneously (sometimes referred to as "chording") will also generate a valid input. However, input device icon 158 graphically indicates that depressing right button 20 alone will not generate a valid input since right portion 164 in displayed an unhighlighted state. In an alternative embodiment of the present invention, graphical representation 160 can be modified to include a graphical indication that double-clicking one of left and right buttons 19 and 20 will generate a valid input.

Figure 5:
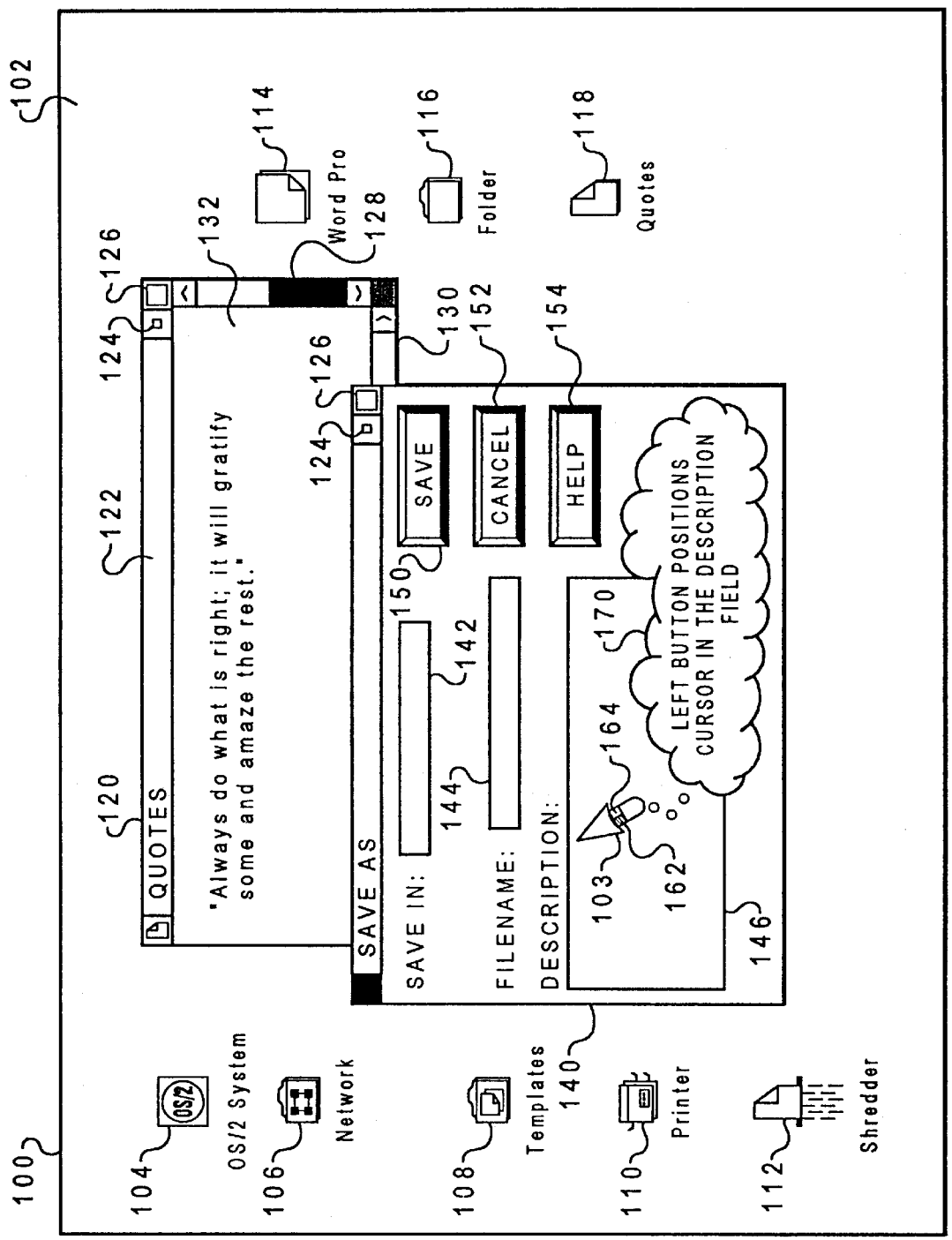
FIG. 5 depicts a graphical user interface (GUI) display in accordance with a second preferred embodiment of the present invention.

With reference now to FIG. 5, a GUI display in accordance with a second preferred embodiment of the present invention is illustrated. As is apparent upon inspection of FIG. 5, the depicted GUI display is similar to that illustrated in FIG. 4 with the exception that graphical representation 160 of mouse 18 is incorporated within graphical pointer 103 rather than displayed as a component of a distinct input device icon 158. In the example depicted in FIG. 5, depressing left button 19 generates a valid input while graphical pointer 103 is positioned within input region 146 of dialog box 140, as indicated by the highlighted state of left portion 152. However, as is also indicated by graphical representation 150, a valid input is not generated by chording or depressing right button 20 alone. Although the input information graphically indicated by graphical representation 150 is generally sufficient for experienced users of data processing system 10, a user may choose to have the input information conveyed more explicitly by invoking a "mouse help" utility. As illustrated, if the mouse help utility is active, the input manager associated with an input region displays a help bubble 170 while graphical pointer 103 is positioned within the input region. The help text within help bubble 170 specifies user inputs that are valid within the input region and the function associated with the user inputs.

Figure 6:
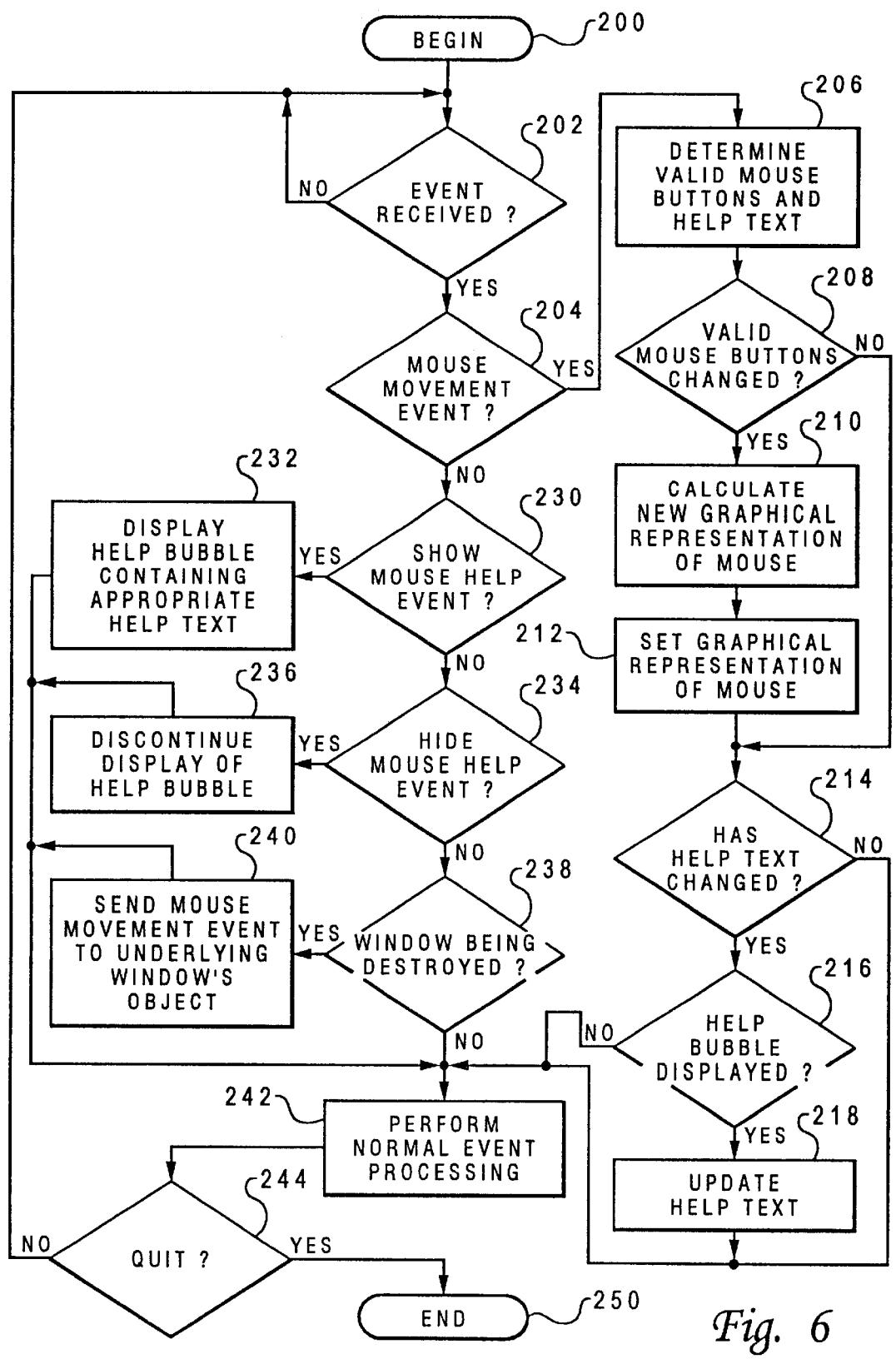
FIG. 6 is a high level logical flowchart illustrating a method of graphically indicating a valid input in accordance with the present invention.

Referring now to FIG. 6, there is depicted a high level logical flowchart of a process followed by an input manager method of a program object in response to receipt of an event. In accordance with a preferred embodiment of the present invention, a process like that illustrated in FIG. 6 is executed for each input region within display screen 100. As depicted, the process begins at block 200 and thereafter proceeds to block 202, which illustrates a determination of whether or not an event has been received by the program object 93. If not, the process iterates at block 202 until such time as an event is received by the program object 93. In response to receipt of an event, the program object 93 routes the event to the input manager method associated with the current position of graphical pointer 103. The process then proceeds from block 202 to block 204, which depicts a determination by the input manager method of whether or not the received event indicates that the user has moved mouse 18. If not, the process passes to block 230, which is described below. However, in response to a determination that the received event is a mouse movement event, the process proceeds to block 206.

Block 206 illustrates a determination of the valid inputs, if any, for the current position of graphical pointer 103 and the help text associated with the valid inputs. The determination illustrated at block 206 can be made, for example, by accessing data within object data 95 that are associated with the cartesian coordinates contained within the event. Next, the process proceeds to block 208, which depicts a determination of whether or not the valid inputs have changed since the receipt of the last event. This determination is made, for example, by comparing the current mouse button state with the previous mouse button state. In response to a determination that the valid inputs have not changed, the process passes to block 214. However, in response to a determination that the valid inputs have changed, the process proceeds from block 208 to block 210, which depicts the calculation of a new graphical representation 160 of mouse 18 to be displayed within display screen 100. Thus, at block 210, a determination is made whether or not to display left and right portions 162 and 164 in an unhighlighted or highlighted state and whether or not to display bar 166. The process then proceeds to block 212, which illustrates setting graphical representation 160. In a preferred embodiment of the present invention in which the display of graphical representation is controlled by GUI manager 91, the step illustrated at block 212 entails constructing and sending a message to GUI manager 91 that indicates which, if any, of left and right portions 162 and 164 to display in a highlighted state and whether or not to display bar 166.

Next, the process proceeds from block 212 to block 214, which depicts a determination of whether the help text associated with the current mouse button state has changed since the receipt of the previous event. If not, the process passes to block 244, which is described below. However, in response to a determination that the help text associated with the current mouse button state has changed, the process proceeds to block 216, which illustrates a determination of whether a help bubble 170 is currently displayed to the user. If so, the process passes to block 218, which illustrates the input manager updating the help text displayed within help bubble 170. Following the updating of the help text or following a determination at block 216 that a help bubble 170 is not currently being displayed, the process proceeds to block 242, which is described below.

Referring again to block 204, in response to a determination that the received event is not a mouse movement event, the process passes to block 230, which depicts a determination of whether or not the event indicates that the user has requested the display of mouse help text, for example, by selecting a "mouse help" menu item from a pull-down menu available within application window 120. If so, the process passes to block 232, which illustrates the input manager method displaying a help bubble 170 containing the help text associated with the current mouse button state. The process then passes to block 242, which is described below. Referring again to block 230, in response to a determination that the event does not indicate that mouse help text should be displayed, the process proceeds to block 234, which depicts a determination of whether or not the event indicates a user request to discontinue the display of mouse help text. If so, the process passes to block 236, which illustrates the input manager discontinuing the display of a help bubble 170. The process then passes from block 236 to block 242, which is described below. If, on the other hand, a determination is made at block 234 that the event does not indicate a user request to discontinue the display of help text, the process passes to block 238. Block 238 illustrates a determination of whether or not the event indicates that the window in which graphical pointer 103 is positioned is being destroyed (i.e., closed). If so, the process passes to block 240, which depicts the input manager method sending a mouse movement event to the program object associated with the underlying window (or desktop). Thus, for example, if the user destroys dialog box 140 by positioning graphical pointer 103 over minimize button 124 and depressing left button 19, the input manager method associated with minimize button 140 sends a mouse movement event to the program object 93 associated with application window 120, since following the destruction of dialog box 140, graphical pointer 103 will be positioned within application window 120. After block 240, the process passes to block 242, which is described below.

Referring again to block 238, in response to a determination that the received event does not indicate that the current window is being destroyed, the process proceeds to block 242, which illustrates the input manager method (and possibly other methods of the program object 93) processing the event normally. Thereafter, the process passes to block 244, which illustrates a determination of whether or not the user has input a quit command. If not, the process returns to block 202, which has been described. If, however, the user has input a quit command, the process passes from block 244 to block 250 and terminates.

As has been described, the present invention provides an improved method and system for graphically indicating whether or not a manipulation of a user input device will generate a valid input within an identified region of a GUI display. Although the present invention has been described with reference to preferred embodiments in which the user input device for which a graphical indication of valid inputs is provided comprises a graphical pointing device, those skilled in the art will appreciate from the foregoing description that a graphical indication can similarly be provided for other input devices. Such input devices can include, but are not limited to, microphones and audio circuitry performing speech-to-text conversion, touch screens, and keyboards. Further, although in the described preferred embodiments selection of a region is accomplished by positioning a graphical pointer within the selected region, those skilled in the art will appreciate that other methods of identifying a region of a GUI display can include selected keystrokes or other inputs generated by user input devices. Moreover, although the described preferred embodiment of the present invention displays a graphical indication of valid inputs and processes user inputs utilizing a GUI manager and distinct input manager methods, it will be understood that the numerous possible implementations of software that graphically indicates valid inputs utilizing a graphical object corresponding to a user input device can each be viewed as an input indication manager.

While the invention has been particularly shown and described with reference to preferred embodiments, it will be understood by those skilled in the art that various changes in form and detail may be made therein without departing from the spirit and scope of the invention.

What is claimed is:

1. A method within a data processing system of graphically indicating a valid input, wherein said data processing system includes a display device and a graphical pointing device having a plurality of user-activated buttons, said method comprising:

displaying a graphical display within said display device, said graphical display including one or more regions and a graphical pointer that has a location within said graphical display determined by said graphical pointing device;

identifying a particular region among said one or more regions; and displaying, within said graphical pointer, a graphical representation of said graphical pointing device, said graphical representation of said graphical pointing device including a plurality of areas that each correspond to a respective one of said plurality of user-activated buttons, wherein an aspect of said plurality of areas indicates whether or not pressing two of said user-activated buttons substantially simultaneously will generate a valid input when said graphical pointer is positioned within said particular region.

* * * * *